United States Patent
Pawar et al.

(10) Patent No.: US 10,637,795 B2
(45) Date of Patent: Apr. 28, 2020

(54) IDENTIFYING AND MANAGING CONNECTED NODES AS RESERVABLE RESOURCES IN A NETWORK

(71) Applicant: Cisco Technology, Inc., San Jose, CA (US)

(72) Inventors: Durgaprasad Sukhadeo Pawar, Santa Clara, CA (US); Vikram Prasad Munishwar, Santa Clara, CA (US); Avaneesh Anandrao Kadam, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 15/484,251

(22) Filed: Apr. 11, 2017

(65) Prior Publication Data

US 2018/0295066 A1  Oct. 11, 2018

(51) Int. Cl.
*H04L 12/913* (2013.01)
*H04L 29/08* (2006.01)
*H04L 12/911* (2013.01)

(52) U.S. Cl.
CPC .......... *H04L 47/724* (2013.01); *H04L 47/826* (2013.01); *H04L 67/10* (2013.01); *H04L 67/12* (2013.01); *H04L 67/325* (2013.01)

(58) Field of Classification Search
CPC ... H04L 41/046; H04L 47/724; H04L 47/826; H04L 67/325

See application file for complete search history.

(56) References Cited

U.S. PATENT DOCUMENTS

| | | | |
|---|---|---|---|
| 6,377,579 B1* | 4/2002 | Ofek | H04L 12/6418 370/395.4 |
| 9,071,925 B2 | 6/2015 | Viswanathan et al. | |
| 9,392,077 B2 | 7/2016 | Borzycki et al. | |
| 9,507,630 B2 | 11/2016 | Addepalli et al. | |
| 2005/0008010 A1* | 1/2005 | Reed | H04L 12/56 370/360 |
| 2008/0196037 A1* | 8/2008 | Ple | G06F 9/3851 718/107 |
| 2010/0131636 A1* | 5/2010 | Suri | H04L 45/00 709/224 |
| 2012/0166833 A1* | 6/2012 | Iwai | G06F 1/3203 713/320 |
| 2014/0359552 A1 | 12/2014 | Misra et al. | |

(Continued)

OTHER PUBLICATIONS

"Internet of Things Global Standards Initiative", http://www.itu.int/en/ITU-T/gsi/iot/Pages/default.aspx, 3 pages, Accessed Dec. 28, 2016, ITU.

(Continued)

*Primary Examiner* — Austin J Moreau
(74) *Attorney, Agent, or Firm* — Behmke Innovation Group LLC; James M. Behmke; Jonathon P. Western

(57) ABSTRACT

In one embodiment, a device in a network maintains a plurality of applications executed by the device. The device associates the plurality of applications with a node in the network. The device schedules a time period during which a particular one of the applications is authorized to access the node associated with the applications. The device relays data packets between the node and the particular application during the scheduled time period.

20 Claims, 10 Drawing Sheets

(56) References Cited

U.S. PATENT DOCUMENTS

2015/0237627 A1* 8/2015 Deniau ............. H04W 72/0453
375/303
2015/0365399 A1* 12/2015 Biswas .................... G06F 9/00
726/8

OTHER PUBLICATIONS

Hellbrück, et al., "Using and Operating Wireless Sensor Network Testbeds with WISEBED", The 10th IFIP Annual Mediterranean Ad Hoc Networking Workshop, 8 pages, 2011, IEEE.

Kanter, et al., "Conceptual Framework for Internet of Things' Virtualization via OpenFlow in Context-aware Networks", International Journal of Computer Science Issues, vol. 10, Issue 6, https://arxiv.org/ftp/arxiv/papers/1401/1401.7437.pdf, Nov. 2013, 12 pages, Arxiv.org.

Shelby, et al., "CoRE Resource Directory", CoRE Internet-Draft, <draft-ietf-core-resource-directory-09>, Oct. 31, 2016, 55 pages, Internet Engineering Task Force Trust.

* cited by examiner

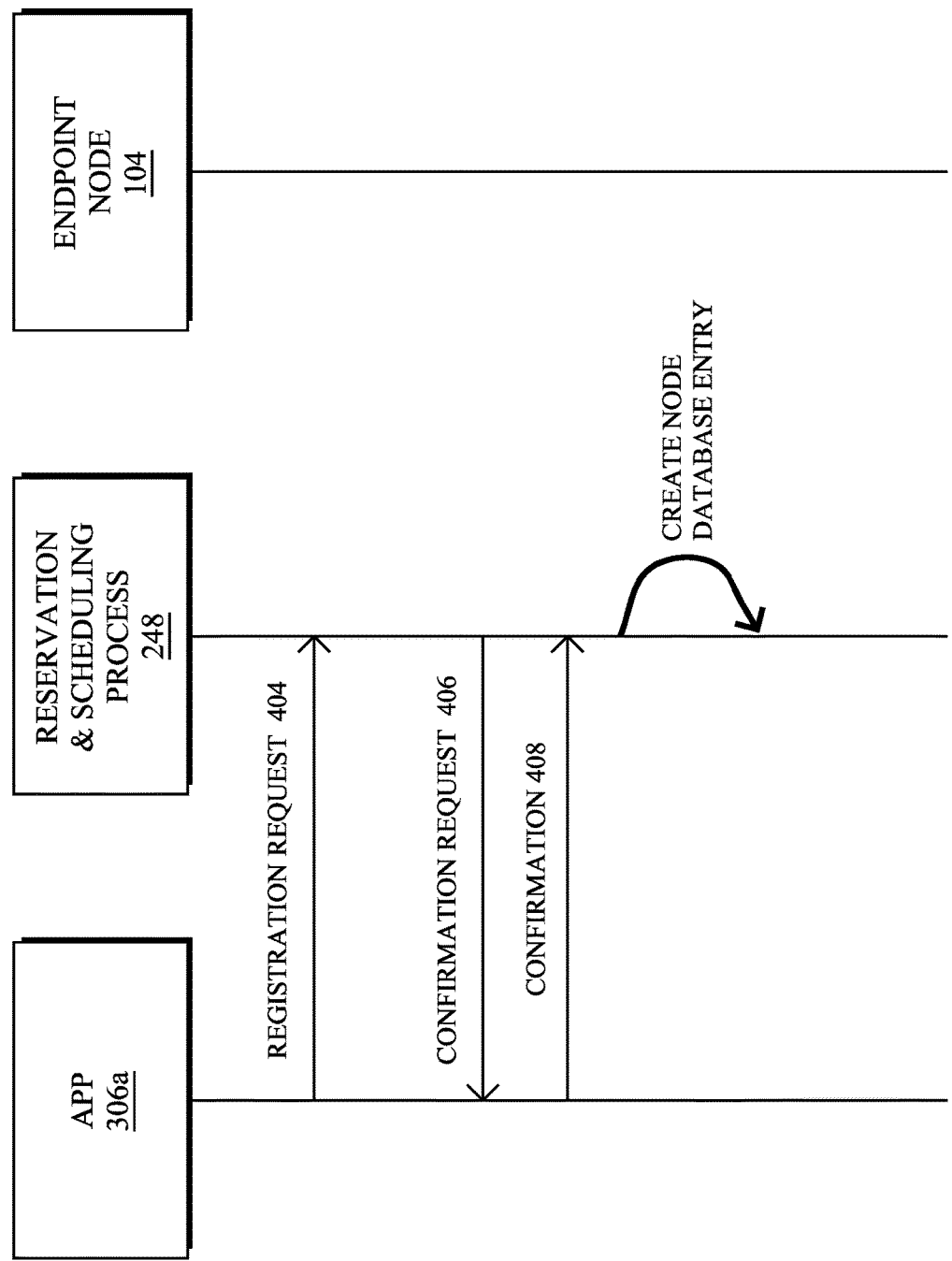

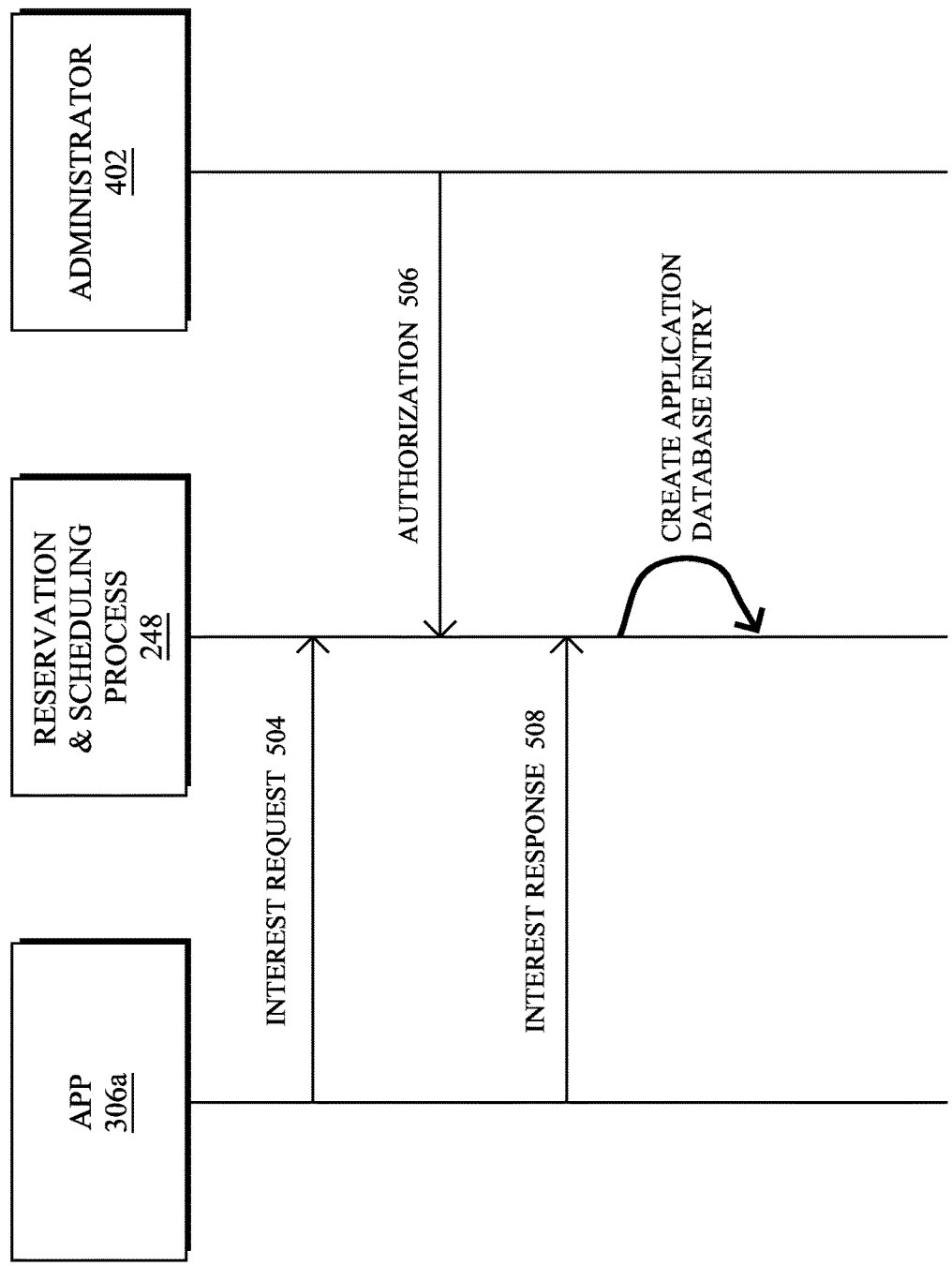

IDENTIFYING AND MANAGING CONNECTED NODES AS RESERVABLE RESOURCES IN A NETWORK

TECHNICAL FIELD

The present disclosure relates generally to computer networks, and, more particularly, to identifying and managing connected nodes as reservable resources in a network.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-is thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network. To support these paradigm changes, many IoT gateways of the future will support a number of different types of physical interfaces.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4B illustrate examples of a node being registered for sharing;

FIG. 5 illustrates an example of an application expressing interest in a network node;

DESCRIPTION OF EXAMPLE EMBODIMENTS

Overview

Figure 1:
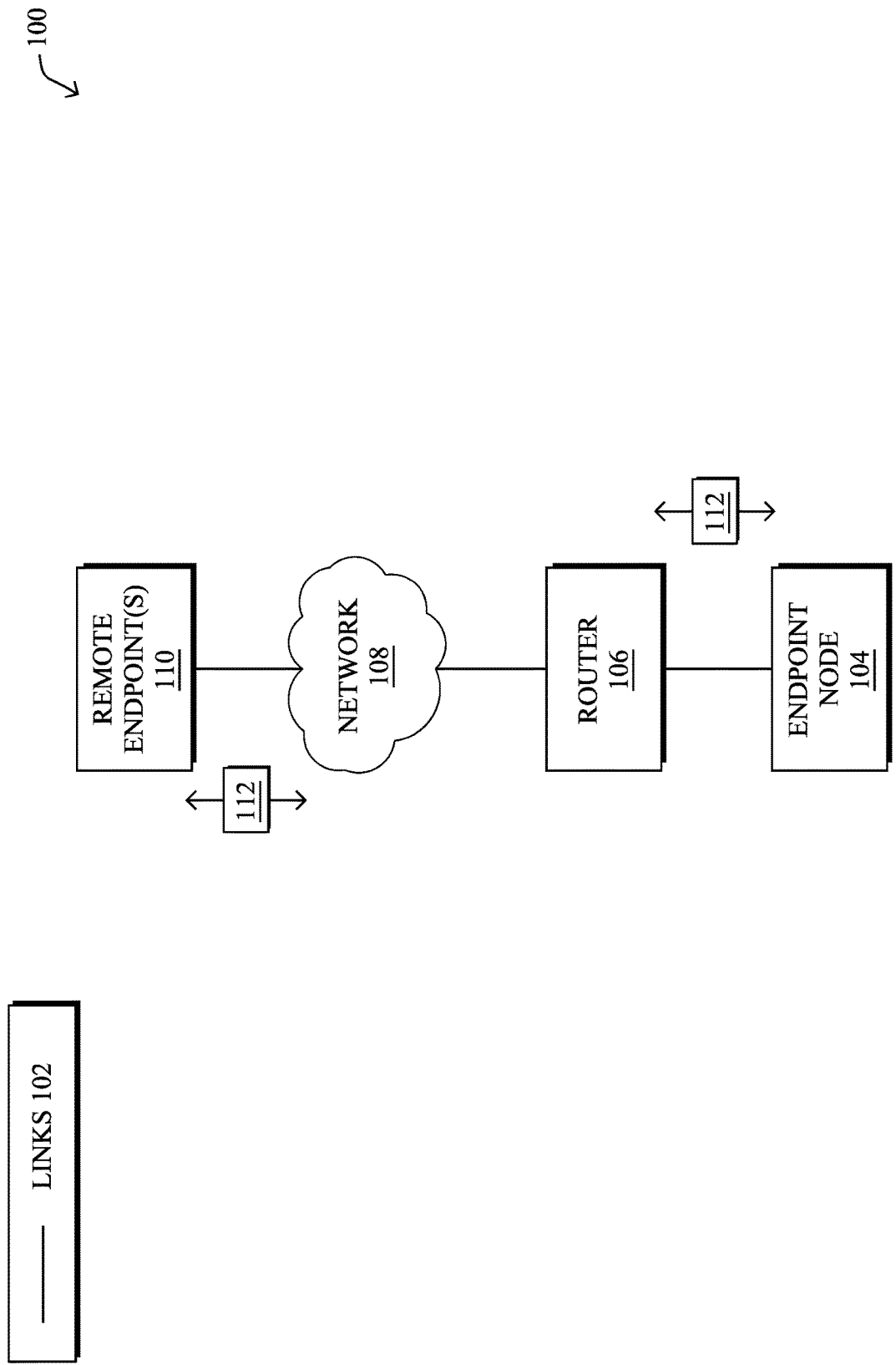
FIG. 1 illustrates an example communication network.

According to one or more embodiments of the disclosure, a device in a network maintains a plurality of applications executed by the device. The device associates the plurality of applications with a node in the network. The device schedules a time period during which a particular one of the applications is authorized to access the node associated with the applications. The device relays data packets between the node and the particular application during the scheduled time period.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices, such as an endpoint node 104. During operation, endpoint node 104 may exchange packets 112 with any number of remote endpoints 110 via a network 108. For example, remote endpoints 110 may include, but are not limited to, devices/servers located within a remote data center, corporate location (e.g., branch, campus, etc.), or part of a cloud-based service.

A router 106 may communicatively couple endpoint node 104 to network 108, which may include the public Internet, a multiprotocol label switching (MPLS) virtual private network (VPN), or the like. For example, router 106 may be a gateway or edge router that connects a LAN in which endpoint node 104 is located to network 108, which may be a WAN. As would be appreciated, any number of networking devices may present in computer network 100 to provide communications between the nodes/devices shown. For example, there may be any number of switches, firewalls, intrusion detection systems (IDSs), intrusion protection systems (IPSs), traffic analyzers, or the like, located between the endpoint node 104 and remote endpoints 110.

Links 102 may comprise any form of known wired or wireless communication link, or combination thereof. Example wired links may include, but are not limited to, fiber optic links, Ethernet-based links (e.g., Category 5/5e cabling, Category 6 cabling, etc.), digital subscriber line (DSL) links, coaxial links, T carrier links, E carrier links, or the like. Example wireless links may include, but are not limited to, near field-based links, WiFi™ links, satellite links, cellular links, infrared links, Bluetooth™, or the like.

Packets 112 (e.g., traffic/messages) may be exchanged among the nodes/devices of the computer network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In various embodiments, endpoint node 104 may be an IoT device that is part of an IoT network serviced by router 106. Loosely, the term "Internet of Things" or "IoT" refers to uniquely identifiable objects (things) and their virtual representations in a network-based architecture. In particular, the next frontier in the evolution of the Internet the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

As would be appreciated, many IoT devices are greatly constrained when compared to traditional computing devices. Notably, many IoT devices often have very limited resources in terms of processing power, memory, and/or energy (battery), and their interconnects are characterized by, illustratively, high loss rates, low data rates, and/or instability. For example, a battery-powered sensor may power itself on periodically, transmit a sensor reading, and then power down, to conserve energy.

In many cases, IoT networks are implemented as shared-media mesh networks, such as wireless or PLC networks, etc., often referred to as Low-Power and Lossy Networks (LLNs), which are a class of network in which both the local routers and their interconnects are constrained. Notably, their interconnections are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point).

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Because of the significant limitations of typical IoT and LLN nodes, computations are often offloaded to a remote device. For example, as shown in FIG. 1, computations on behalf of endpoint node 104 may be performed by remote endpoints 110, such as by a cloud-based service. A more recent computational paradigm is referred to as "fog computing," which shifts the computations to any of the intermediary devices/nodes between the endpoint node and the "cloud," typically at the edge of the local network of the endpoint node. For example, router 106 may act as a fog computing device that performs computations on data from endpoint node 104, which may not have the local resources to do so, as is typical in IoT implementations.

Figure 2:
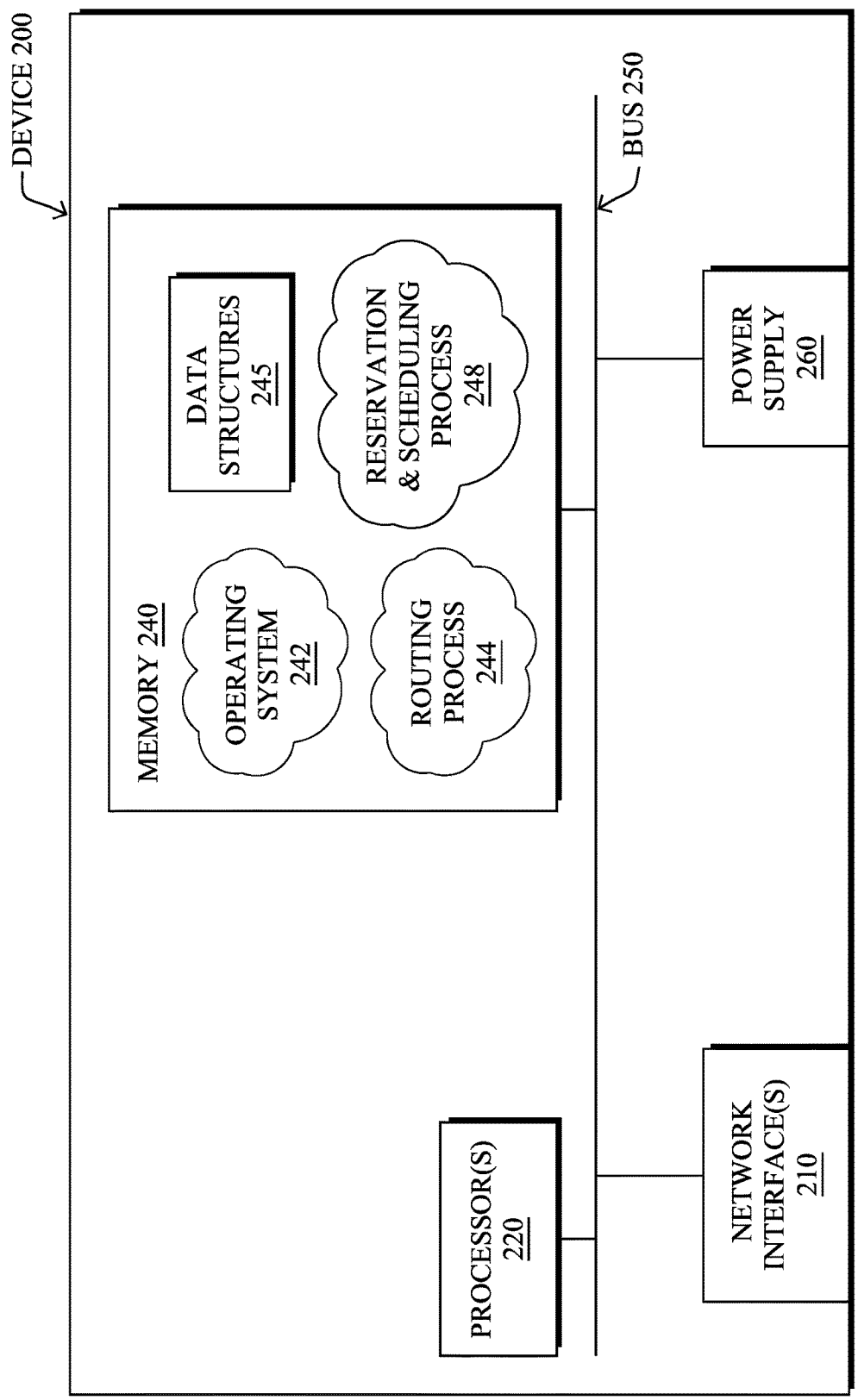
FIG. 2 illustrates an example network device/node.

FIG. 2 is a schematic block diagram of an example node/device 200 that may be used with one or more embodiments described herein, e.g., as any of the computing devices shown or referred to with respect to FIG. 1, particularly router 106, remote endpoint(s) 110, or any other computing device that supports the operations of network 108 (e.g., switches, etc.), as well as any of the other devices referenced below. The device 200 may also be any other suitable type of device depending upon the type of network architecture in place, such as IoT nodes, etc. As shown, device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, reservation and scheduling process 248, as described herein, any of which may alternatively be located within individual network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, the IoT creates opportunities for integrating many real-world devices into a computer system. To materialize this broader potential of the IoT, one of the key requirements is to be able to share endpoint nodes (e.g., sensors and actuators), along with their configurability, with users. However, today's deployment and usage of endpoint nodes are primarily application-based and vendor-specific. In particular, sensors and actuators deployed today by one vendor are typically not shared with that of other vendors. As a result, developing the infrastructure needed to share endpoint nodes with other applications and vendors has received a little attention.

By way of example, security personnel from a control room may monitor surveillance cameras, to detect suspicious people within a monitored campus. However, in the event of fire in the campus, the fire department may also wish to access the cameras (e.g., to change the pan, tilt, and zoom levels), to obtain more details about the severity and spread of the fire. In another example, different applications may want to set different band-pass filter settings in acoustic sensors before capturing readings.

Also as noted above, with fog-based computing, the same router, which may be connected to any number of different sensors from different vendors, may also execute any number of different applications. This makes the requirement for sharing access to an endpoint node with different applications even more prominent.

Identifying and Managing Connected Nodes as Reservable Resources in a Network

The techniques herein allow multiple applications executed by the same fog computing node to share access to a given node in the network, such as a IoT sensor or actuator. In some aspects, the techniques herein allow the fog computing node to provide timeshare access to the application such that a given application has exclusive access to the node during its scheduled time period. In further aspects, the techniques herein also allow for the fog computing device to adjust the configuration of the node in advance of a given application accessing the node, based on the specific requirements of the application.

Specifically, according to one or more embodiments of the disclosure as described in detail below, a device in a network maintains a plurality of applications executed by the device. The device associates the plurality of applications with a node in the network. The device schedules a time period during which a particular one of the applications is authorized to access the node associated with the applications. The device relays data packets between the node and the particular application during the scheduled time period.

Illustratively, the techniques described herein may be performed by hardware, software, and/or firmware, such as in accordance with the reservation and scheduling process 248, which may include computer executable instructions executed by the processor 220 (or independent processor of interfaces 210) to perform functions relating to the techniques described herein, e.g., in conjunction with routing process 244.

Operationally, an intelligent reservation and scheduling system is introduced herein that schedules multiple applications such that they can share IoT node resources, such as sensors or actuators. A key insight herein is that sensors may not be 100% duty-cycled and, hence, can be shared among multiple applications at a finer granularity, by satisfying each applications different sensor configuration requirements. In various embodiments, this scheduling system may be implemented on a fog computing device, allowing the applications scheduled for access to be executed closer to the endpoint sensor or actuator.

Figure 3:
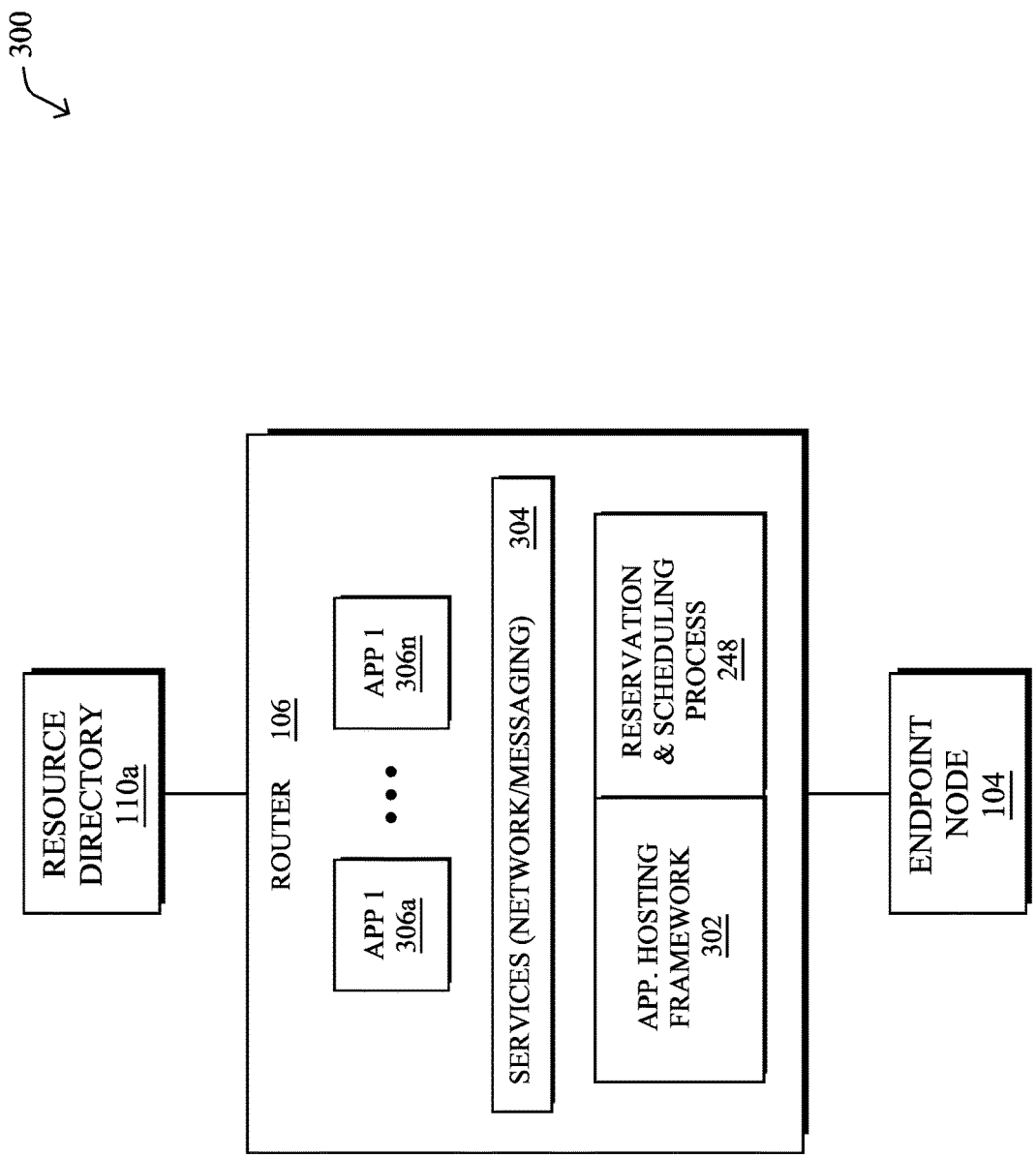
FIG. 3 illustrates an example architecture for identifying and managing connected devices as reservable resources.

FIG. 3 illustrates an example architecture 300 for identifying and managing connected devices as reservable resources, according to various embodiments. In the example shown, consider the nodes/devices from FIG. 1, particularly router 106, which may be configured as a fog computing device within the network. In other embodiments, the fog computing device may be another form of networking device (e.g., a switch, etc.) and/or another endpoint node in the network. Generally, as part of the fog computing framework, the fog computing device may maintain and execute any number of client applications that process data from nodes in the network and/or provide control commands to the nodes.

Assume for purposes of illustration that endpoint node 104 is a sensor or actuator in the network that captures sensor data and/or performs operations in response to receiving control commands. For example, if endpoint node 104 is a security camera, it may capture aud and/or video sensor data from the surrounding area. In addition, the camera may have a number of configurations that can be set via actuation control commands. For example, such a control command may adjust the pan, tilt, or zoom of the security camera.

Router 106 may execute an application hosting framework 302 that allows for any number of client applications 306 (e.g., a first through nth application) to be executed by router 106. Application hosting framework 302 may also use network/messaging services 304 to relay data packets between client applications 306 and any number of distributed nodes in the network, such as endpoint node 104. For example, IOx by Cisco Systems, Inc. provides an application hosting framework that uses network/messaging services to relay data packets between the locally-hosted applications and distributed nodes in the network. In some embodiments, reservation and scheduling process 248 may be implemented as part of the application hosting framework 302, to coordinate and schedule access to the network nodes by applications 306. Each of applications 306 that then wish to interact with endpoint node 104 may use application program interfaces (APIs) of process 248 to request and access the functions of node 104.

In some embodiments, reservation and scheduling process 248 may also communicate with a resource directory 110a which may be local to the fog network or located remotely. Generally, resource directory 110a may use the Constrained Application Protocol (CoAP) or a similar mechanism, to provide information to router 106 regarding the various nodes in the network, such as endpoint node 104. Using the information provided by resource directory 110a, reservation and scheduling process 248 may build a database of network nodes that wish to offer their services in a shared manner.

Figure 4A:
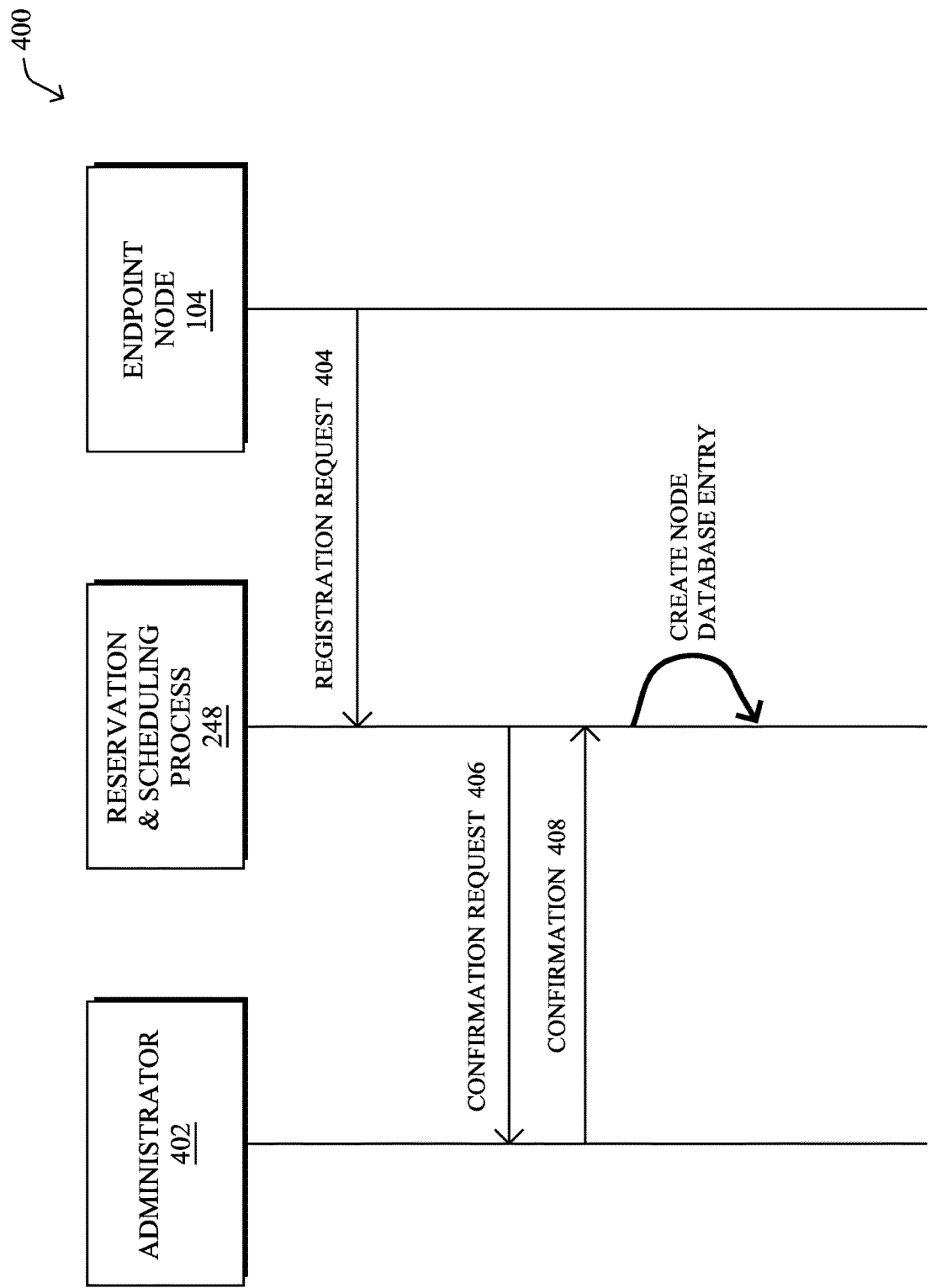

FIGS. 4A-4B illustrate examples of a node being registered for sharing, according to various embodiments. Generally, the procedures shown may be performed when an endpoint node comes online, to register the node with reservation and scheduling process 248 of the fog computing device, router 106. Such a procedure may also be performed when attaching a new sensor or other node to the network.

As shown in example 400 of FIG. 4A, the node registration procedure may begin by endpoint node 104 itself sending a registration request 404 to reservation and scheduling process 248. This could be performed, for example, using CoAP or a CoAP-like protocol. Generally, registration request 404 may include information about endpoint node 104 for inclusion in a node database maintained by registration request 404. For example, registration request 404 may include the ID of node 104, a sharing profile for node 104, configuration information for node 104 (e.g., channel information, configurable parameters, etc.), timing information (e.g., the time needed to enact a configuration change, etc.), security information (e.g., to validate the identity of node 104, etc.), or the like. In turn, reservation and scheduling process 248 may store this information in a node database and/or provide this information to resource directory 110a described previously.

Optionally, reservation and scheduling process 248 first seek confirmation of the registration of node 104 from an administrator device 402. For example, reservation and scheduling process 248 may send a confirmation request 406 to administrator device 402 that includes some or all of the information from registration request 404, prior to adding node 104 to the node database. In turn, a human administrator or an automated administration process may confirm and/or update these settings. For example, a human administrator may do so using Fog Director by Cisco Systems, Inc., or a similar application. In turn, administrator device 402 may send a confirmation message 408 to reservation and scheduling process 248 indicative of the decision as to whether node 104 should be registered and how. If approved, reservation and scheduling process 248 may save the corresponding information in the node database.

FIG. 4B illustrates an alternate example 410 in which node 104 does not issue the registration request. For example, in some cases, node 104 may not be capable of issuing such a request. As shown, the vendor application 306a may instead issue the registration request 404 to reservation and scheduling process 248 on behalf of endpoint node 104. For example, the application from the vendor of a security camera may register the security camera with reservation and scheduling process 248.

Regardless of the initiator of the node registration, reservation and scheduling process 248 may enter any or all of the following information into the node database:

NodeID—unique ID to identify the sensor/actuator node

Share Profile—Information about 'sharability' of the node
  Private—sharing is not allowed. In other words, the owner/vendor application reserves exclusive access to this resource.
  Shared—sharing of this resource is allowed with properly authorized applications.

Configuration Channel—This tells reservation and scheduling process 248 how the node can be configured and tuned.
  With CoAP like protocols, this can be as simple as a POST uniform resource indicator (URI).
  If the node uses a proprietary channel, it can specify ways to communicate with the application 306 achieve configuration (e.g., a compile-time contract exported using library APIs, etc.-tune or reconfigure the resource of the node.

Timing Information—
  The time required to re-tune or reconfigure the resource of the node.
  For tuning parameters like band-pass filters, sampling frequency, etc., typically sensors would require non-zero cycles to apply such changes.
  Reservation and scheduling process 248 may leverage this timing information when reserving and scheduling access to the node by applications 306.

FIG. 5 illustrates an example 500 of an application expressing interest in a network node, according to various embodiments. When applications (e.g. an application 306a hosted on fog node) boots up/activates, it may choose to use one or more sensors or actuators deployed in the network. At this stage, application 306a may send an interest request 504 to reservation and scheduling process 248 expressing its interest. Interest request 504 may include, for example, the specific identifier for the node of interest (e.g., node 104) or, alternatively, any other information that reservation and scheduling process 248 can use to identify the appropriate node offering the requested resource/service. Interest request 504 may also include any of the information needed by reservation and scheduling process 248 to associate application 306a with node 104, such as configuration information for node 104 (e.g., how application 306a wishes node 104 to be configured during use), timing information (e.g., when application 306a wishes to access node 104), and the like. In turn, reservation and scheduling process 248 may store any or all of the information from interest request 504 in an application database, thereby associating application 306a with the requested node.

In some embodiments, reservation and scheduling process 248 may seek authorization for application 306a to access the requested node, before storing its information in the application database. For example, reservation and scheduling process 248 may exchange authorization information 506 with administrator 402 or a device associated with the vendor or manufacturer of the requested node, to determine whether application 306a is authorized to access the node and, if so, under what conditions.

If application 306a is authorized to access the requested node, reservation and scheduling process 248 may return an interest response 508 to application 306a with the details needed to complete such access. For example, interest response 508 may include an access key so that this key can be used between the application's interface with reservation and scheduling process 248 for future communication.

Upon successful operation, reservation and scheduling process 248 may create an entry in an application database with any or all of the following details based on interest request 504:
  AppID—Application ID of the application.
  NodeID—Node ID of the node that the application wants to access.
  Interest profile:
    Access Key—used for further communication
    Shared/Exclusive Access Flag—This flag may indicate whether the application is to have exclusive or shared access to the node.
    Preemption Flag—This flag may indicate whether the application can preempt the access of any other application currently using the node. For example, an emergency service application (e.g., fire department application, police application, etc.) may preempt access to a security camera during times of emergency.

Figure 6A:
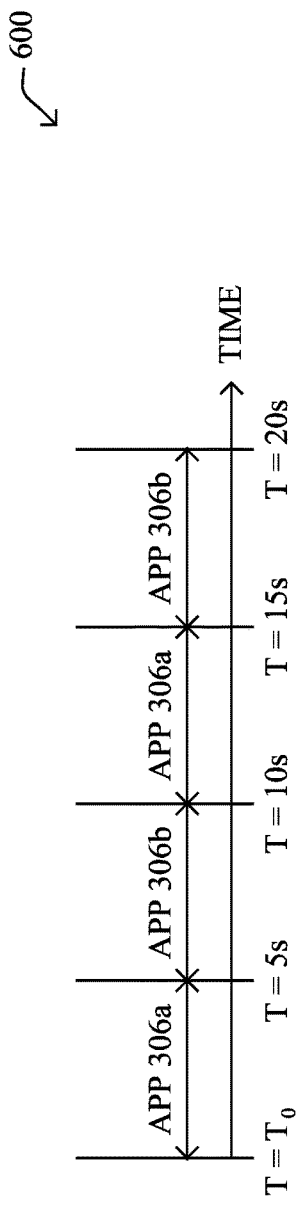
FIGS. 6A-6C illustrate examples of scheduling time periods for a network node.
Figure 6B:
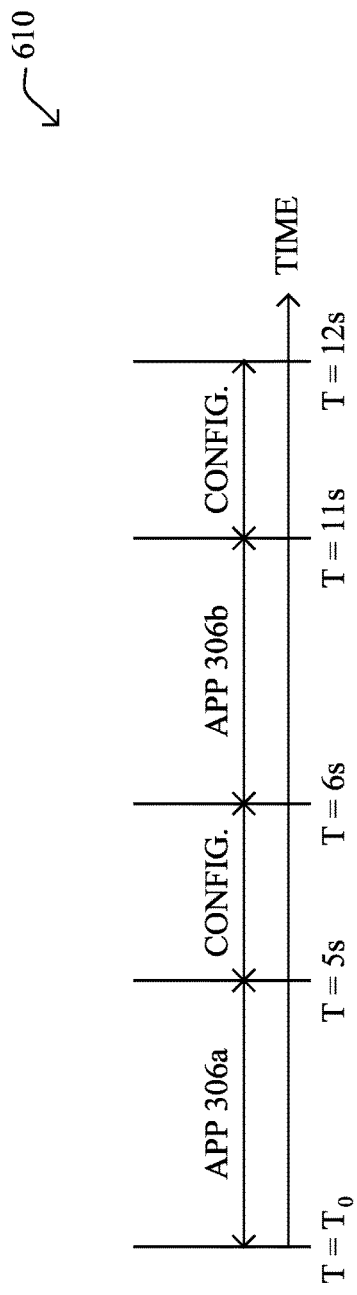
Figure 6C:
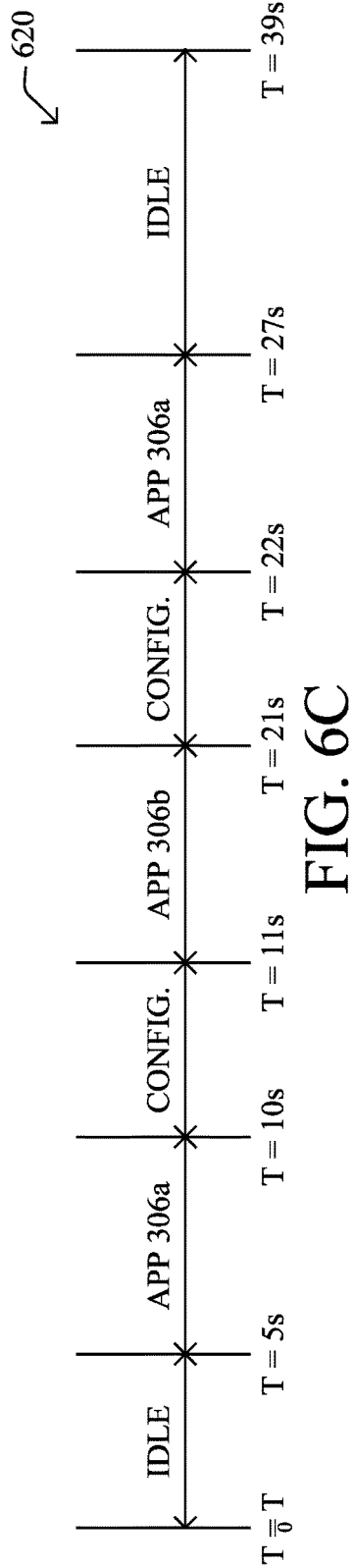

FIGS. 6A-6C illustrate examples of scheduling time periods for a network node, according to various embodiments. In example 600 of FIG. 6A, consider the idealistic case in which access to a given node is shared by two applications, applications 306a and 306b. Each of applications 306a-306b may require access for intervals of five seconds each. Thus, reservation and scheduling process 248 may schedule application 306a for access in the time period $T=t_0$ to $T=5$ s, application 306b may be scheduled for access in the time period $T=5$ to $T=10$ s, etc.

In a more likely scenar as shown in the example 610 of FIG. 6B, however, the accessed node may require a certain amount of time to adjust its configuration for the accessing application. For example, again in the case of a security camera, it may take one second for the camera to adjust its pan, tilt, and zoom settings, which may differ for each of applications 306a and 306b. Accordingly, reservation and scheduling process 248 may also account for the time needed for configuration changes when scheduling access by applications 306a-306b. As a result, application 306a may receive a scheduled access time period of five seconds every twelve seconds, application 306b may receive a scheduled access time period of five seconds every twelve seconds, and the remaining two seconds of the twelve second interval may be reserved for node configuration changes.

In a further example 620, as shown in FIG. 6C, the node itself may also have idle cycles in which the node is in an idle or sleep state to conserve power. This is a fairly typical scenar for many low power IoT nodes that rely on batter power. In such a case, reservation and scheduling process 248 may also factor these idle time periods into the overall access schedule for the node. To further illustrate the operations of reservation and scheduling process 248, also assume that in example 620 that application 306a has a required access time of five seconds, but application 306b has an access time period requirement of ten seconds.

As shown, reservation and scheduling process 248 may grant application 306a a five second access time period every seventeen seconds and application 306b a ten second access time period every thirty four seconds. Immediately prior to each of the access time periods scheduled for applications 306a-306b may be scheduled time periods during which the configuration of the node may be tuned (e.g., adjusted). The remaining time periods may be reserved as idle time periods during which the node can operate in its idle or sleep state.

Figure 7A:
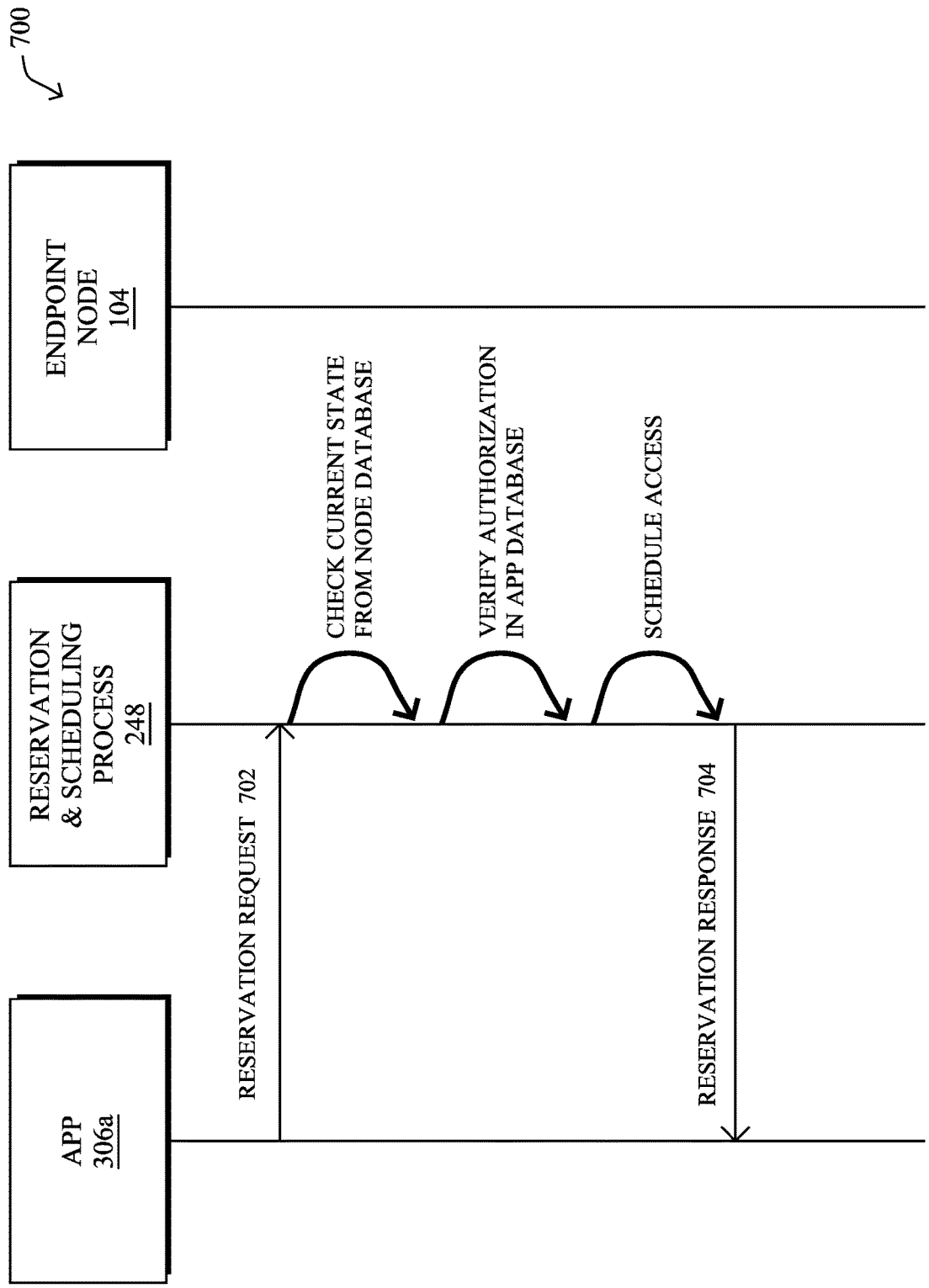
FIGS. 7A-7B illustrate an example of an application accessing a network node.
Figure 7B:
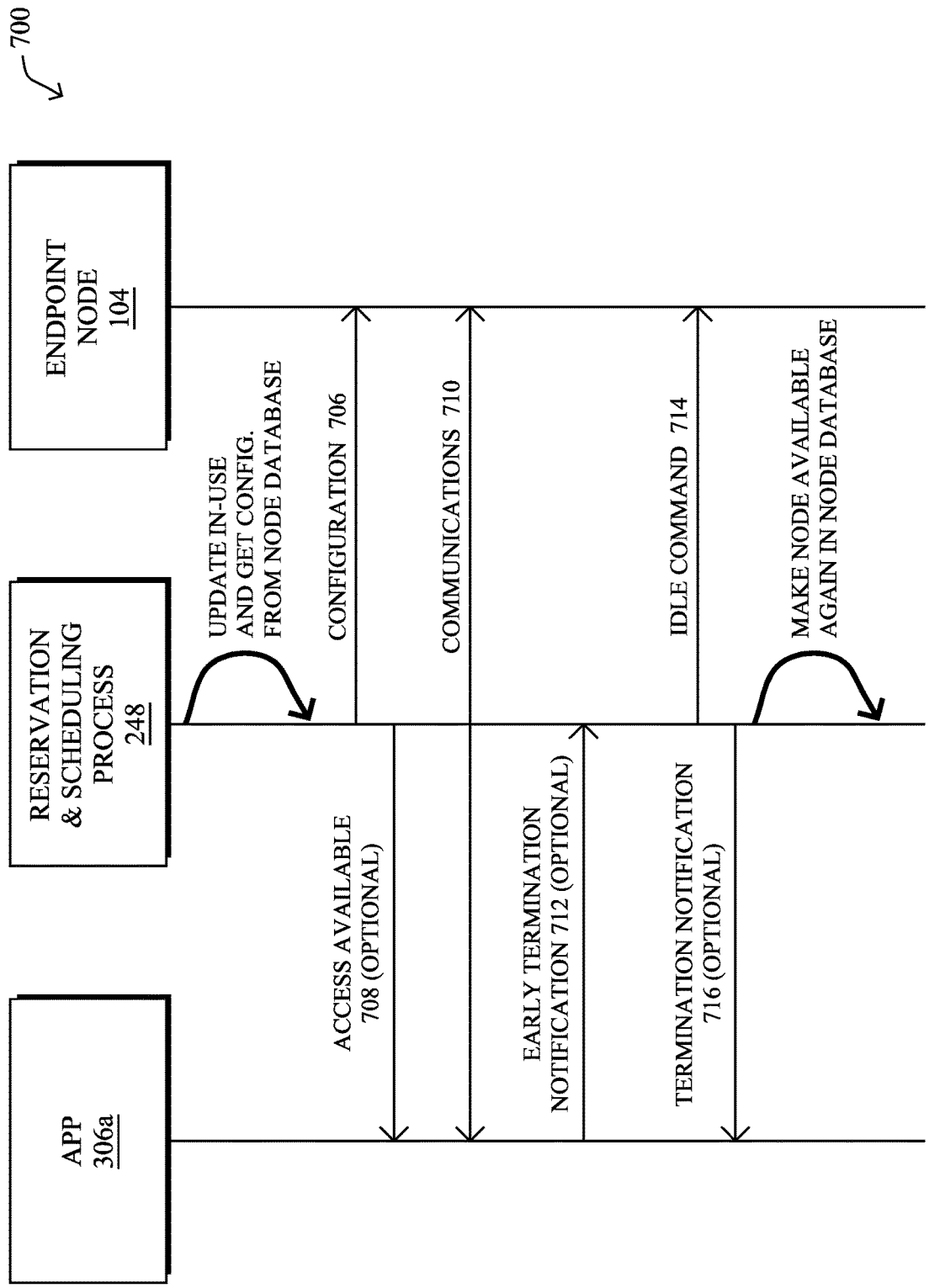

FIGS. 7A-7B illustrate an example 700 of an application accessing a network node, according to various embodiments. As shown, assume that endpoint node 104 has already been registered with reservation and scheduling process 248 and has been entered in the node database), as described with respect to FIGS. 4A-4B. Further, assume that that application 306a has also registered its interest in node 104 with reservation and scheduling process 248 (and has been entered in the application database), as described with respect to FIG. 5.

As shown in FIG. 7A, when application 306a actually intends to use the resource of node 104 either immediately or at some time in the future, it may send a reservation request 702 to reservation and scheduling process 248. Reservation request 702 may include any or all of the following information:
  AppID, NodeID, & AccessID—This information allows reservation and scheduling process 248 to know which node that application 306a wants to access, as well as its current level of access authorization.
  Time parameters:
    Start-time: either of following:
      Now: for on-demand access;
      Future: time=t (e.g., 11:00 PM);
      First-slot: Any slot where reservation and scheduling process 248 can accommodate the request;
    End-time:
      The time at which the application expects to end its node access (e.g., at the end of one week). This parameter could be zero for one-time access or, alternatively, infinite in the case of continual access while the application and node are alive.

Periodicity:
- One-time: It's a one-time access, e.g. read temperature
- Recurring: r (e.g. r=1 hr.—the application wants to use this resource every hour, etc.).

Slice:
- Time (t=5 sec)—For example, the application may want to access (read/write) the node for 5 s every time it gets scheduled (e.g. control camera's PTZ parameters and get video for 5 seconds). This value could be t=0 for instantaneous reads (e.g., read current temperature).

Node configuration: Sensor configuration that the application wants the node to use. For example, the application may want to tune a low pass filter on an acoustic sensor before reading aud stream.
- When reservation and scheduling process 248 schedules access to a node for a particular application, reservation and scheduling process 248 may set this configuration on behalf of the application.

In response to receiving reservation request 702, reservation and scheduling process 248 may check the already committed schedules for node 104 from its node database. Such a schedule may be maintained in a reservation table within the node database. Likewise, reservation and scheduling process 248 may also use the application database to verify that application 306a is indeed authorized to access node 104 (e.g., based on the AccessKey included in reservation request 702). The authorization check may also determine whether application 306a is authorized to access node 104 in shared mode.

Based on the information in the node database and the application database, reservation and scheduling process 248 may schedule a time period during which application 306a is authorized to access node 104. For example, reservation and scheduling process 248 may take into account the access requests of other applications 306, the time needed to implement any node configuration changes between applications, and/or any idle time periods needed by the node. In turn, reservation and scheduling process 248 may send a reservation response 704 back to application 306a that indicates the scheduled access time periods for application 306a. Conversely, if the requested time-slot is conflicting, reservation response 704 will indicate rejection of the requested schedule.

As shown in FIG. 7B, assume now that it is approaching the scheduled time for application 306a to access node 104. In such a case, reservation and scheduling process 248 may mark the NodeID of node 104 as in-use within the node database. In addition, in some embodiments, reservation and scheduling process 248 may retrieve the required node configuration for node 104 that is associated with application 306a from the node database.

During the scheduled configuration time period that is prior to the scheduled access time period for application 306a, reservation and scheduling process 248 may send the configuration 706 to endpoint node 104. This allows endpoint node 104 to tune/reconfigure itself to the specific configuration requirements of application 306a, just prior to its scheduled access time. This may be achieved, for example, using the configuration channel information provided to reservation and scheduling process 248 during registration of node 104. Example node configurations may include, but are not limited to:

1. A sampling frequency that the node should use.
2. Content notification details (e.g., endpoint details for the accessing application to which the node is to send collected data).
3. Application specific configurations (e.g., passive low pass filter of acoustic sensor, pass band starts from 0 Hz or DC and continues up to the specified cut-off frequency point, say −3 dB, etc.).

Optionally, reservation and scheduling process 248 may send an access available notification 708 to application 306a, to indicate that node 104 is now ready for use by application 306a. This is optional because node 104 can also initiate its own communications directly with application 306a (e.g., using its CoAP-like notification protocol).

During the scheduled access time period, node 104 and application 306a may exchange communications 710, such as sensor readings, control commands, or the like. As would be appreciated, the application hosting infrastructure of the device executing application 306a may relay the data packets between application 306a and node 104 in the network.

In some embodiments, application 306a may optionally elect to terminate its access time period early. For example, if application 306a receives the sensor reading that it needs, it may determine that no further communications 710 with node 104 are needed during this time period. In such cases, application 306a may send an early termination notification 712 to reservation and scheduling process 248, thereby allowing reservation and scheduling process 248 to update the access schedule of node 104, accordingly.

In some cases, such as when the next time period is an idle time period, reservation and scheduling process 248 may send an idle command 714 to node 104. In turn, node 104 may enter into its idle or sleep mode, accordingly.

Optionally, reservation and scheduling process 248 may also notify application 306a of the end of its scheduled access time period via a termination notification 716.

Finally, reservation and scheduling process 248 may mark the resource of node 104 as available again in the node database, so that other applications 306 can be given the next available access time period and be configured to meet the configuration requirements of the next accessing application 306.

Several assumptions can be made with respect to the scheduling by reservation and scheduling process 248:

1. It is assumed that reservation and scheduling process 248 has access to the list of all nodes connected directly or indirectly with the fog device, as well as their configuration parameters. Configuration parameters of a node may include, e.g., its feasible sampling rate interval, set of configurations that can be changed, the minimum time required to apply a new configuration (e.g., a configuration reset time), and the like.
2. It is also assumed that the applications send reservation requests to reservation and scheduling process 248 whenever they want to reserve access to a node. This reservation request may include the following fields: <App-Id, start-time, end-time, set of sensors>. Based on this data, reservation and scheduling process 248 finds and reports the best possible schedule to the application.
3. It is further assumed that the logic to enforce that the applications are not accessing shared sensors outside of their reservation window is present in the system, as well. For example, this can be added as a rule to the security and enforcement layer on the switch, etc.

As discussed above, an application may specify the start_time, end_time, periodic interval, and time slice duration for its access. For instance, an application may request an access to the camera surveillance network for 1 day, where it wants to take a 5 second video every 1 hour. Here, periodicity is 1 hour, and slice is 5 seconds. This requirement can be split into multiple entries and added to the reservation table of the node database.

For example, consider that applications A2, A2, and A3 ask for reservation slots in order as below, in the form:

<app-id, start-time, end-time, periodic-interval, slice, set of sensors>

<A1, t0, t0+1 day, 60, 5 sec, {s1, s4, s6}>
<A2, t0, t0+1 day, 30, 5 sec, {s4, s6, s7}>
<A3, t0+180, t0+270, 1, 1 sec, {s2, s3}>

This means,

A1 wants to sense for 5 seconds every hour for a day.
A2 wants to sense for 5 seconds every 30 mins for a day.
A3 wants to sense for 1 second every minute for one hour.

These scheduling requirements can be split into finer granularity, based on periodic interval and slice, and added to the reservation table of the node database.

For instance, reservation and scheduling process 248 may split <A1, t0, t0+1 day, 60, 5 sec, {s1, s4, s6}> into multiple entries as below (in form <App-id, start-time, end-time, sensors-set>):

<A1, t0, t0+5, {s1, s4, s6}>
<A1, t0+60, t0+65, {s1, s4, s6}>
<A1, t0+120, t0+125, {s1, s4, s6}>

Thus, reservation and scheduling process 248 maintains current and future reservations, as detailed in Table 1 below, which is sorted based on the <start-time> of reservation. Note that time required to change node configurations is considered to be 1 second. Hence, A2's start-time is A1's end time+1 second. Note further that A3's requirement is not conflicting, so can be added directly in Table 1.

TABLE 1

| AppID | Start Time | End Time | Nodes/Sensors |
|---|---|---|---|
| A1 | $t_0$ | $t_0 + 5$ s | {$s_1$, $s_4$, $s_6$} |
| A2 | ($t_0 + 6$) | ($t_0 + 6$) + 5 s | {$s_4$, $s_6$, $s_7$} |
| A1 | ($t_0 + 60$) | ($t_0 + 60$) + 5 s | {$s_1$, $s_4$, $s_6$} |
| A2 | ($t_0 + 66$) | ($t_0 + 66$) + 5 s | {$s_4$, $s_6$, $s_7$} |
| A1 | ($t_0 + 120$) | ($t_0 + 120$) + 5 s | {$s_1$, $s_4$, $s_6$} |
| ... | ... | ... | ... |
| A3 | ($t_0 + 180$) | ($t_0 + 270$) | {$s_2$, $s_3$} |

In other words, not only is reservation and scheduling process 248 able to schedule application access to any given node, it may also be able to schedule times at which a given application can access multiple nodes in the network. Note that applications can also specify other policies such as if the required reservation slot is not available, provide the next available slot, etc. While such policies can certainly be implemented, for simplicity a simple reservation policy is described that either accepts or rejects a reservation.

Pseudocode for reservation and scheduling process 248 may be as follows:

Input:

App_id, start-time, end-time, set of nodes.
/*Each node is a structure/class that includes the nodeID, periodic_interval, slice, and desired config. */

List of nodes to be accessed and their configuration parameters

Output:

Reservation decision: Yes/No

Function RESERVE_SCHEDULE (AppID, start_time, end_time, periodic_interval, node_set)

```
{
    time = start_time;
    while( time < end_time)
    {
        start = time;
        end = slice;
        IF ( (is_slot_free_in_table(start, end, node_set) == True) OR
           (Can_serialize(start_time, end_time, node_set) == True) )
           {Reserve(AppID, start_time, end_time, node_set);}
        time += periodic_interval;
    }
}
Function CAN_SERIALIZE (AppID, start_time, end_time, node_set)
{
    conflicting_apps[ ] = get_conflicting_app_schedules(start_time,
end_time, node_set);
    FOR each app in conflicting_apps {
        FOR each common node n {
            cfg_change_duration = get_smallest_cfg_chg_duration(n);
            IF (cfg_change_duration < cfg_reset_time)
                return FALSE;}
        }
    return TRUE;
}
Function RESERVE (AppID, start_time, end_time, node_set)
{
    Add entry to table
    Start timer, say End_Timer to end reservation
}
Function END_TIMER_HANDLER (AppID, start_time, end_time)
{
    Send configuration to reset the node
    Remove entry from table
}
```

Figure 8:
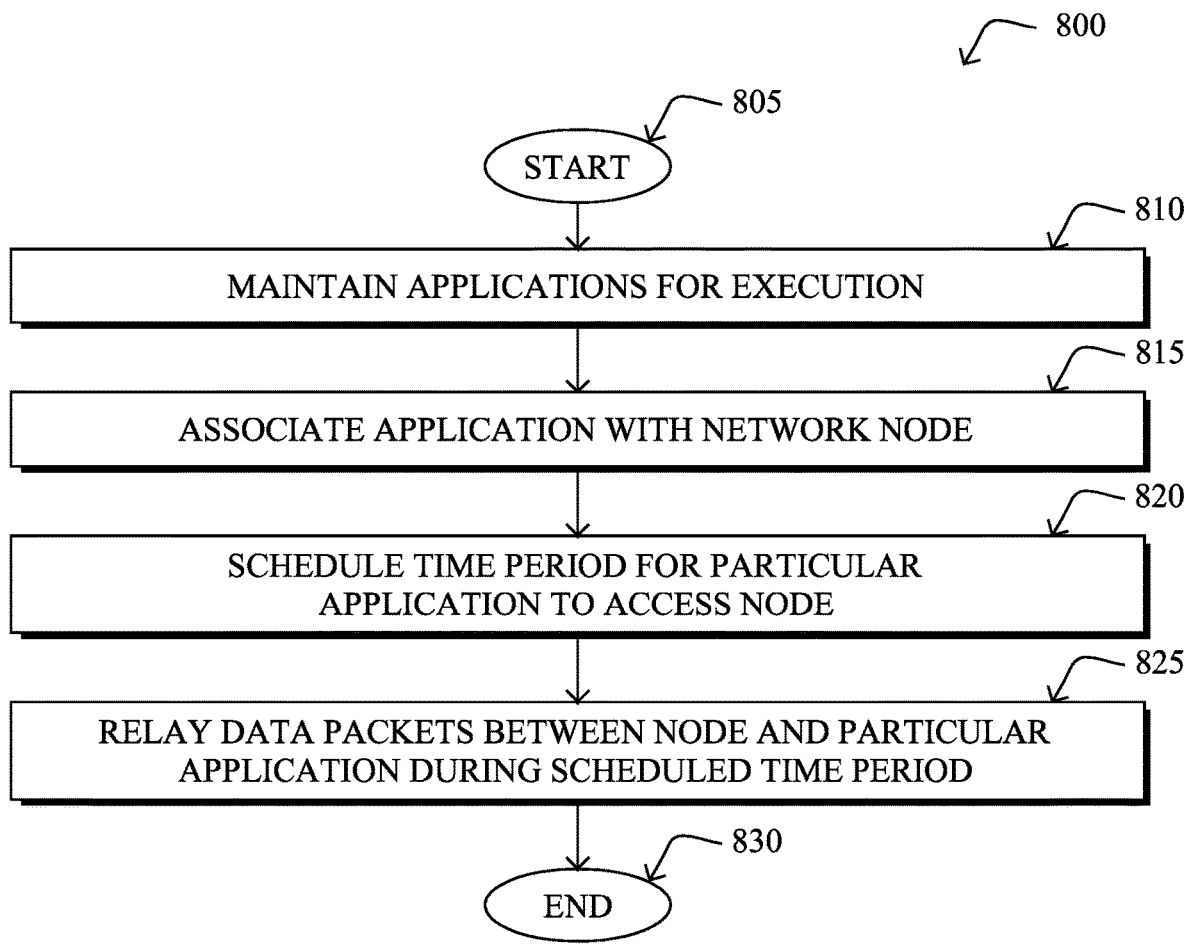
FIG. 8 illustrates an example simplified procedure for scheduling application access to a network node.

FIG. 8 illustrates an example simplified procedure for scheduling application access to a network node in a network in accordance with one or more embodiments described herein. For example, a non-generic, specifically configured device (e.g., device 200) may perform procedure 800 by executing stored instructions (e.g., process 248). The procedure 800 may start at step 805, and continues to step 810, where, as described in greater detail above, the device may maintain a plurality of applications executed by the device. For example, in some embodiments, the device may be a fog-computing device on which any number of applications are installed and execute. Such a device may be, for example, a router, switch, or other networking device, in these cases.

At step 815, as detailed above, the device may associate the applications with a node in the network. For example, the device may register the interests of the applications in accessing the node. Such registration may include, e.g., desired node configurations and other information that the device may use to schedule access of the node by the applications.

At step 820, the device may schedule a time period during which a particular one of the applications is authorized to access the node, as described in greater detail. Notably, the device may determine an access time period for the application based on the access requirements of the other nodes, the time needed for the node to swap configurations, and/or any idle time needed by the node.

At step 825, as detailed above, the device may relay data packets between the node and the particular application during the scheduled time period. For example, if the node is a sensor, the device may send packets that include sensed data from the node to the application. Conversely, if the node is an actuator, the device may relay control packets from the particular application to the node, during the scheduled time period. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow deployed sensors and actuators in a network to be offered as reservable resources that can be accessed by any number of fog applications.

While there have been shown and described illustrative embodiments that provide for scheduling node access, it is to be understood that various other adaptations and modifications may be made within the spirit and scope of the embodiments herein. For example, while certain protocols are shown, such as CoAP, other protocols may be used as desired.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   maintaining, by a device in a network, a plurality of applications executed by the device;
   registering, in a node database, a node in the network as available for use by a given application, wherein the node database stores information characterizing one or more aspects of the node;
   registering, in an application database, an interest of a particular one of the applications in using the node, wherein the application database stores information characterizing one or more aspects of the interest of the particular application in using the node;
   scheduling, by the device, a time period during which the particular application is authorized to access the node based on the information stored in the node database characterizing the one or more aspects of the node and the information stored in the application database characterizing the one or more aspects of the interest of the particular application in using the node; and
   relaying, by the device, data packets between the node and the particular application during the scheduled time period.

2. The method as in claim 1, wherein the node comprises a sensor or actuator in the network.

3. The method as in claim 1, further comprising:
   executing, by the device, the applications within virtual machines (VMs) or containers.

4. The method as in claim 1, wherein the device is a network router or switch.

5. The method as in claim 1, further comprising:
   scheduling, by the device, a configuration time period that is immediately prior to the time period during which the particular application is authorized to access the node associated with the applications; and
   sending, by the device, a configuration associated with the particular application to the node during the configuration time period.

6. The method as in claim 1, further comprising:
   scheduling, by the device, an idle time period this is immediately after the time period during which the particular application is authorized to access the node associated with the applications; and
   signaling, by the device, the node to enter into an idle or sleep mode during the scheduled idle time period.

7. The method as in claim 1, further comprising:
   receiving, at the device, a registration request from the node to register the node with the device.

8. The method as in claim 1, further comprising:
   receiving, at the device, an interest request from the particular application regarding the node, wherein the scheduled time period for the particular application is based in part on the interest request.

9. The method as in claim 1, further comprising:
   receiving, at the device, a registration request from one of the applications to register the node or the application with the device.

10. An apparatus, comprising:
    one or more network interfaces to communicate with a network;
    a processor coupled to the one or more network interfaces and configured to execute a process; and
    a memory configured to store the process executable by the processor, the process when executed configured to:
    maintain a plurality of applications executed by the apparatus;
    register, in a node database, a node in the network as available for use by a given application, wherein the node database stores information characterizing one or more aspects of the node;
    register, in an application database, an interest of a particular one of the applications in using the node, wherein the application database stores information characterizing one or more aspects of the interest of the particular application in using the node;
    schedule a time period during which the particular application is authorized to access the node based on the information stored in the node database characterizing the one or more aspects of the node and the information stored in the application database characterizing the one or more aspects of the interest of the particular application in using the node; and
    relay data packets between the node and the particular application during the scheduled time period.

11. The apparatus as in claim 10, wherein the node comprises a sensor or actuator in the network.

12. The apparatus as in claim 10, wherein the process when executed is further operable to:
    execute the applications within virtual machines (VMs) or containers.

13. The apparatus as in claim 10, wherein the apparatus is a network router or switch.

14. The apparatus as in claim 10, wherein the process when executed is further configured to:

schedule a configuration time period that is immediately prior to the time period during which the particular application is authorized to access the node associated with the applications; and send a configuration associated with the particular application to the node during the configuration time period.

15. The apparatus as in claim 10, wherein the process when executed is further configured to:

schedule an idle time period this is immediately after the time period during which the particular application is authorized to access the node associated with the applications; and signal the node to enter into an idle or sleep mode during the scheduled idle time period.

16. The apparatus as in claim 10, wherein the process when executed is further configured to:

receive a registration request from the node to register the node with the apparatus.

17. The apparatus as in claim 10, wherein the process when executed is further configured to:

receive an interest request from the particular application regarding the node, wherein the scheduled time period for the particular application is based in part on the interest request.

18. The apparatus as in claim 10, wherein the process when executed is further configured to:

receive a registration request from one of the applications to register the node or the application with the apparatus.

19. A tangible, non-transitory, computer-readable medium storing program instructions that, when executed by a device in a network, cause the device to perform a process comprising:

maintaining, by the device, a plurality of applications executed by the device;

registering, in a node database, a node in the network as available for use by a given application, wherein the node database stores information characterizing one or more aspects of the node;

registering, in an application database, an interest of a particular one of the applications in using the node, wherein the application database stores information characterizing one or more aspects of the interest of the particular application in using the node;

scheduling, by the device, a time period during which the particular application is authorized to access the node based on the information stored in the node database characterizing the one or more aspects of the node and the information stored in the application database characterizing the one or more aspects of the interest of the particular application in using the node; and relaying, by the device, data packets between the node and the particular application during the scheduled time period.

20. The computer-readable medium as in claim 19, wherein the process further comprises:

preventing, by the device, one or more of the applications from accessing the node during the scheduled time period.

* * * * *

UNITED STATES PATENT AND TRADEMARK OFFICE
CERTIFICATE OF CORRECTION

PATENT NO. : 10,637,795 B2
APPLICATION NO. : 15/484251
DATED : April 28, 2020
INVENTOR(S) : Durgaprasad Sukhadeo Pawar et al.

It is certified that error appears in the above-identified patent and that said Letters Patent is hereby corrected as shown below:

In the Specification

In Column 1, Line 25, please amend as shown:
(BYOD) model to a model that enables bring-your-own- In Column 3, Line 38, please amend as shown:
lar, the next frontier in the evolution of the Internet is the In Column 7, Line 21, please amend as shown:
a security camera, it may capture audio and/or video sensor In Column 8, Line 55, please amend as shown:
exported using library APIs, etc.

In Column 8, Line 56, please remove:
[[the resource of the node.]]

In Column 9, Line 66, please amend as shown:
In a more likely scenario as shown in example 610 of In Column 10, Line 18, please amend as shown:
scenario for many low power IoT nodes that rely on batter In Column 11, Line 17, please amend as shown:
acoustic sensor before reading audio stream.

In Column 15, Line 34, please amend as shown:
thereof. Accordingly this description is to be taken only by Signed and Sealed this
Twenty-second Day of September, 2020

Andrei Iancu
*Director of the United States Patent and Trademark Office*